(12) United States Patent
Martin et al.

(10) Patent No.: US 7,194,440 B2
(45) Date of Patent: Mar. 20, 2007

(54) BILLING METHOD USING SSL/TLS

(75) Inventors: Tobias Martin, Rabenau (DE); Joerg Schwenk, Henfenfeld (DE)

(73) Assignee: Deutsche Telekom AG, Bonn (DE)

( * ) Notice: Subject to any disclaimer, the term of this patent is extended or adjusted under 35 U.S.C. 154(b) by 785 days.

(21) Appl. No.: 10/148,298

(22) PCT Filed: Sep. 6, 2001

(86) PCT No.: PCT/EP01/10262

§ 371 (c)(1),
(2), (4) Date: May 29, 2002

(87) PCT Pub. No.: WO02/28055

PCT Pub. Date: Apr. 4, 2002

(65) Prior Publication Data

US 2003/0069852 A1   Apr. 10, 2003

(30) Foreign Application Priority Data

Sep. 29, 2000 (DE) ................................. 100 48 731

(51) Int. Cl.
*C06F 17/60* (2006.01)
*H04L 9/32* (2006.01)

(52) U.S. Cl. .................... 705/52; 705/1; 705/51; 713/202; 713/155; 713/156; 392/115

(58) Field of Classification Search ............... 705/1, 705/52; 765/1, 51; 713/202, 155, 156; 382/115
See application file for complete search history.

(56) References Cited

U.S. PATENT DOCUMENTS

| | | | | |
|---|---|---|---|---|
| 5,438,508 A * | 8/1995 | Wyman | ............... | 705/8 |
| 5,553,143 A * | 9/1996 | Ross et al. | ............... | 705/59 |
| 5,629,980 A * | 5/1997 | Stefik et al. | ............... | 705/54 |
| 5,671,279 A * | 9/1997 | Elgamal | ............... | 705/79 |
| 5,671,412 A * | 9/1997 | Christiano | ............... | 707/104.1 |
| 5,699,528 A * | 12/1997 | Hogan | ............... | 705/40 |
| 5,943,656 A * | 8/1999 | Crooks et al. | ............... | 705/30 |
| 6,308,277 B1 * | 10/2001 | Vaeth et al. | ............... | 726/10 |
| 6,353,812 B2 * | 3/2002 | Frankel et al. | ............... | 705/44 |
| 6,438,690 B1 * | 8/2002 | Patel et al. | ............... | 713/156 |
| 6,615,258 B1 * | 9/2003 | Barry et al. | ............... | 709/223 |
| 6,636,975 B1 * | 10/2003 | Khidekel et al. | ............... | 726/10 |
| 2002/0059144 A1 * | 5/2002 | Meffert et al. | ............... | 705/51 |

FOREIGN PATENT DOCUMENTS

| | | |
|---|---|---|
| EP | 0812081 | 12/1997 |
| EP | 0880254 | 11/1998 |
| JP | EP 1 041 767 A2 * | 9/1999 |

OTHER PUBLICATIONS

SSL Certificates HOWTO Jan. 2002 Franck Martin.*
Alan O. Freier et al., "The SSL Protocol Version 3.0", XP002923866, Internet Draft, Nov. 18, 1996, pp. 1-63.
Stefan Brands "Electronic Cash on the Internet", 1995, pp. 64-84, in "Proceedings of the Symposium on Network and Distributed System Security".
Dierks & Allen " The TLS Protocol Version 1.0" Jan. 1999, found on URL.www.jetf.org.
Gerpott et al. "Ansaetze zur Preisbldung fuer Internet-Transportdienste" Jul. 1999, pp. 19-27, in "telekom praxis" (see German Search Report).

* cited by examiner

*Primary Examiner*—Andrew J. Fischer
*Assistant Examiner*—John M. Winter
(74) *Attorney, Agent, or Firm*—Darby & Darby

(57) ABSTRACT

A billing method for requesting contents or data in a network in which the client or the person representing the client has a certificate for the billing method. Said certificate contains data that prove the client's identity and that facilitate establishment of a bill or statement. The Secure Socket Layer (SSL) protocol or a variant of the SSL protocol which allows display of a dialog box may be used for the client-server connection, using an SSL client certificate that contains an extension indicating that the certificate is suitable for the purpose of billing, the server transmitting the price for the required content or the data during the handshake protocol. A confirmation message that is also contained in the SSL protocol and that contains a digital signature is sent from the client to the server, said confirmation message confirming the previously transmitted price.

15 Claims, No Drawings

BILLING METHOD USING SSL/TLS

BACKGROUND

The present invention relates to a billing method for requesting contents or data in a network, the client or the customer who uses the client having a certificate for the billing method, the certificate containing verified data which identifies the customer and permits preparation of a bill or billing.

The specification of a billing method for Internet contents constitutes a great challenge. There is a huge demand, in particular, also in telecommunications companies. There exists, for example, the approach in which the existing modem or ISDN connection to the Internet service provider (e.g., T-Online) is disconnected upon calling up a WWW page which is subject to charge, and a new connection is established via a 0190 call number. This approach does not comply with Internet standards and potentially involves a whole host of problems in practice.

The most frequently used billing method in the Internet is billing via credit card. Here, however, the cost and possibilities of abuse are very high.

Today, that is, for securing, for the secure transmission of data in the case of client/server connections, there is a generally accepted standard, the Secure Socket Layer (SSL) protocol, also referred to as Transport Layer Security (TLS). SSL is supported in all WWW browsers and WWW servers today. The slightly modified variant TLS was standardized by the IETF (IETF RFC 2246). SSL/TLS mandatorily supports the authentication of the server and, optionally, the authentication of the client.

SUMMARY OF THE INVENTION

An object of the present invention is to provide a secure billing method which uses protocols which are already available in WWW browers.

The present invention provides a billing method for requesting contents or data in a network, the client or the customer who uses the client having a certificate for the billing method, the certificate containing verified data which identifies the customer and permits preparation of a bill or billing. The Secure Socket Layer—(SSL—) protocol or a variant of the SSL protocol is used for the client/server connection, an SSL client certificate being used in which an extension is set which indicates that the certificate is suitable for billing purposes. During the handshake protocol, the price for the requested content or the data is transmitted from the server to the client, and an acknowledgment message, which is also integrated in the SSL protocol and contains a digital signature, is transmitted from the client to the server, the acknowledgment message acknowledging the previously transmitted price.

The present invention has an advantage over conventional methods that no client software needs to be installed at the customer site because all standard browsers support SSL/TLS. The customer only has to request a special certificate. In practice, however, it is also possible to provide a special SSL client software for the customer which shows him/her the actual price for an Internet page which has been called up. On the server side, only small changes have to be made. The security of the method is high since SSL has proven efficient in practice for many years already.

It is an advantage that the Secure Socket Layer (SSL) protocol or a variant of the SSL protocol which allows display of a dialog box is used for the client/server connection. Advantageously, an SSL client certificate is used in which, for example, an extension is set which indicates that the certificate is suitable for billing purposes. During the handshake protocol, the price for the requested content or the data is then transmitted from the server to the client, and an acknowledgment message, which is also integrated in the SSL protocol and contains a digital signature, is transmitted from the client to the server, the acknowledgment message acknowledging the previously transmitted price. In order to be able to prove the billing at a later time, it is advantageous for the acknowledgment messages and/or log files to be logged by the server and for the data contained therein to be used for billing.

Advantageously, the SSL connection is disconnected upon download of the paid content or of the paid data. In this context, the disconnection can be carried out automatically by the server. In this manner, it is guaranteed that an SSL connection is established again upon a new request of data or WWW contents which are subject to charge.

Alternatively, it is possible for a possibly existing SSL connection to be disconnected by the server or an interconnected Internet page prior to selecting an Internet page which is subject to charge and that thereupon, a new client authentication takes place for downloading the Internet page which is subject to charge.

As a rule, the price for the selected Internet page is indicated to the customer on the preceding page. In this context, however, he/she must rely on the operator of the web server to display the correct price. A fraudulent web server operator could display a different price than is contained in the corresponding protocol message. In this case, the client software of the user would sign the possibly higher price without knowledge of the user. To give the customer better billing transparency here, and to rule out possibilities of fraud, it is advantageous to carry out an interrogation at the client site, in particular, using a dialog box, with the options "next" and "abort" prior to signing the acknowledgment message, in which the displayed cost for the selected Internet page or for the selected data which are subject to charge can be manually acknowledged, the content or the data which are subject to charge being transmitted from the server to the client upon acknowledgment of the cost or else, the interrogation process being terminated. This allows the user to stop a mistakenly selected order which is subject to charge without incurring any cost to him/her.

In this context, the corresponding interrogation can advantageously be implemented via an error message of the client (for example, Certificate Name Check) or via a Java applet or an Active-X application which, in particular, are signed themselves.

All cost information can also be transmitted to the client via signed XML (eXtended Markup Language) pages. In this context, it is possible for the pages to be signed with a price indication and/or with a time indication. Also, a hash value of the content of the page which is subject to charge can additionally be included in the signature.

DETAILED DESCRIPTION

In the following, a possible embodiment of the billing method according to the present invention for the Internet will be described in detail. In this embodiment, the customer requests a special SSL client certificate. In this certificate, an extension is set which indicates that this certificate can be used for billing purposes. The certificate should contain verified data, for example, customer number, etc., which permits preparation of a bill. In this context, pages on a server which are subject to charge can only be viewed via the https protocol with client authentication. The authentication of the client for this URL is logged and stored in a log file. The price for the page which is subject to charge is contained in an SSL message which is transmitted from the server to the client during the handshake protocol (a kind of electronic billing voucher). The server receives an electronic signature of this billing voucher through a corresponding acknowledgment message which is also provided in the SSL protocol. In this manner, it is verifiably documented on the server side that the user has actually requested the page which is subject to charge. Prior to selecting a further page which is subject to charge, the SSL connection is disconnected (for example, by an interconnected http page or through the termination of the connection by the server). Because of this, a new client authentication is required which, in turn, can be logged. The billing data contained in the log file is prepared and forwarded for billing. The log file is kept until the bill is paid or until the customer's period of objection for the direct debiting service has expired. In the following, the billing method will be described in further details. As soon as an SSL connection is established, initially, the SSL handshake protocol is executed. An SSL connection is established, inter alia, when the client requests a web page via the https protocol, for example, in the case of a link of the type https://www.subject-to-charge.com.

In this context, the standardized SSL/TLS handshake protocol includes the following steps:

| | Client | | Server |
|---|---|---|---|
| 1. | ClientHello message including the proposed SSL options | → | |
| 2. | | ← | ServerHello message including the proposed SSL options |
| 3. | | ← | Certificate message including server certificate |
| 4. | | ← | Via the CertificateRequest message, the client is prompted to authenticate itself |
| 5. | | ← | ServerHelloDone message |
| 6. | Certificate message including client certificate | → | |
| 7. | ClientKeyExchange message including session key (encrypted with public key of the server) | → | |
| 8. | CertificateVerify message including signature of all preceding handshake messages | → | |
| 9. | ChangeCipherSpec | → | |
| 10. | Finished | → | |
| 11. | | ← | ChangeCipherSpec |
| 12. | | ← | Finished |

To integrate a billing method into this standard protocol, it is possible to use the ServerHello, Certificate, CertificateRequest, Certificate (of the client) and CertificateVerify messages.

In the ServerHello message, the price for the page can be embedded into the values random (a 32 byte long random value in which the time is included as well) and/or SessionID. If the price is embedded in place of a part of the time, then in fact no negative effects with regard to the security of the SSL/TLS protocol are to be expected since the time is also a publicly known value.

The Certificate message of the server can also be used for transmitting the price if the server gets itself a separate certificate for each possible price (for example, certificates for 1, 2, 5, 10, 50 pfennigs and for 1, 2, 5, 10 DM). Optionally, a pop-up in which this price would then be indicated could be provoked at this point with the aid of slightly incorrect certificates. However, since the behavior of the clients can greatly differ in this point, this method can surely be universally implemented only with difficulty (possibly, an IETF RFC on the behavior of clients in response to incorrect certificates would be required here).

With the aid of the CertificateRequest message, the server communicates to the client a) that the SSL session to be established is subject to charge, and can communicate to it b) the cost for the SSL session to be established.

The billing information (customer number, bank account information, and the like) is contained in the certificate of the client. Since these information items are transmitted with the certificate message. With the CertificateVerify message, the client confirms the purchase, he/she sort of signs the billing voucher.

Technically, this is accomplished as follows (it should be observed that the "new" SSL protocol should continue to be compatible with a standard SSL, that is, a client which has no billing functionality is intended to behave accordingly).

In this context, the CertificateRequest message is composed as follows:

| Prot: 22 | Vers: 3 | 0 | Length I | Length I | Type: 13 | Length II | Length II |
|---|---|---|---|---|---|---|---|
| Length II | CT No. of | CT 1 | CT2 | ... | CT n | CAs No. of | CA 1 L. |
| | | Name of CA 1 | | | | | CA 2 L. |
| | Name of CA 2 | | | | ... | Ca n L. | |
| | | | Name of CA n | | | | |

The first five bytes describe the protocol (SSL handshake), the SSL version and the length of the entire message. The next four bytes describe the type of the handshake message (CertificateRequest) and its length. Following is a list of certificate types: First, the number of (permitted) certificate types, then the certificate types themselves (a number between 1 and 255). This is followed by a list of permitted certificate authorities (CAs), in this case, number of CAs, name length of CA 1, name of CA 1, and so on.

A certificate authority is described with its distinguished name (DN). A distinguished name can be described with the aid of the in specified description language ASN.1 as follows:

Name :: = SEQUENCE OF RelativeDistinguishedName
RelativeDistinguishedName :: = SET OF AttributeValueAssertion
AttributeValueAssertion : := SEQUENCE {
        attributeType OBJECT IDENTIFIER
        attributeValue ANY }

Attribute types which are usually used are the following:

```
countryName       :: = SEQUENCE{ {2 5 4    StringType (SIZE(2) )}
                     6},
organization      :: = SEQUENCE{ {2 5 4 10}, StringType (SIZE(1...64) ) }
organizationalUnitName    :: =    SEQUENCE{ {2 5 4 11},
                                          StringType ( SIZE (1...64))}
commonName     :: = SEQUENCE{ {2 5 4 3},   StringType (SIZE (1...64) ) }
localityName       :: = SEQUENCE{ {2 5 4 7}, StringType(SIZE(1...64) ) }
stateOrProvinceName       :: = SEQUENCE{ {2 5 4 8},
                                          StringType ( SIZE (1...64) ) }
```

These attributes therefore uniquely describe a certificate authority whose certificates are acknowledged by the server for authenticating the client. What is decisive for extending the SSL protocol to an Internet billing method is that a distinguished name can also be used to describe a price for an SSL session. To this end, the commonName attribute is set to "PRICE" and, in addition, the attribute types

```
currency :: =   SEQUENCE{ {2 x y z},    StringType (SIZE(3) ) }
amount :: =     SEQUENCE{ {2 x y z},    INTEGER }
cent :: =       SEQUENCE{ {2 x y z},    INTEGER { 0, ...,99 } }
``` are used.

Consequently, a corresponding CertificateRequest message which contains the price information is a list including the distinguished names of the CAs which issue billing certificates and, in addition, contains a distinguished name of the form

```
commonName:    "PRICE",  currency: "EUR",  amount:19,   cent:95
```

This distinguished name does, of course, not refer to a certificate authority which exists in reality but is used in the list of permitted certificate authorities only to document the price for the SSL session.

A client which possesses an appropriate billing certificate of one of the permitted certificate authorities transmits this [appropriate billing certificate] to the server in the certificate message. In the extension field, the certificate contains one or more extension values including billing information such as
   account number, bank identifier code
   alternatively: customer number
   alternatively: credit card number
   maximum amount up to which the certificate is valid
With the Certificate Verify message, the client finally signs the virtual sales slip: this message contains a hash value which is signed by the client and composed as follows:

```
MD5 (master secret, 48times   5C_{16},   MD5 (HandshakeMessages,
MasterSecret, 48times 36_{16})
```

This hash value (MD5) is, in particular, calculated with a hash value (inner MD5) which is generated, inter alia, using all handshake messages which have been exchanged up to this point of time. From there, it follows that the corresponding electronic signature of this hash value is to be treated as equivalent of a signature of the preceding handshake messages provided that the master secret is known during the checking of this signature. Since the preceding handshake messages contained, inter alia, the ServerHello, Certificate and CertificateRequest messages of the server with the price, it is documented by the signature in the Certificate Verify message that the client has taken notice of the demanded price.

For each established SSL session, the exchanged handshake messages, the MasterSecret and the hash value with the signature of the Certificate Verify message of the client are logged by the server. With this information the operator of the server can later prove that such an SSL connection was established during which the respective price was demanded.

A standard SSL client possessing a certificate issued by a billing CA would provide the respective certificate to the server since it (the standard SSL client) is able to gather from the list of permitted CAs which certificate is required to establish this connection. It (the standard SSL client) would ignore the distinguished name having the commonName "PRICE" but nevertheless also hash this DN in the Certificate Verify and, consequently, sign it as well.

A correspondingly modified SSL client would evaluate the DN having the commonName "PRICE" of the CertificateRequest message and display it to the user prior to continuing the handshake.

Of course, the above-described modifications of the known SSL protocol are only exemplary and other modifications can, of course, be made depending on the given circumstances.

What is claimed is:

1. A method of billing a client for requested data in a network, the method comprising:
   requesting data in the network by the client; establishing a secure correction in the network between the client and a server using a security management protocol for the secure connection, the security management protocol being a secure socket layer protocol or a variant of a secure socket layer protocol;
   providing a certificate including verified data identifying the client and an extension indicating that the certificate is suitable for billing purposes;
   transmitting, during a handshake process of the security management protocol, a price within this requested data from the server to the client; and
   transmitting, during the handshake process, an acknowledgment message acknowledging the price from the client to the server, wherein the acknowledgment message is integrated in the security management protocol and contains a digital signature.

2. The billing method as recited in claim 1 further comprising logging the acknowledgment message by the server and using information from the acknowledgment message for billing.

3. The billing method as recited in claim 1 further comprising downloading the requested data to the client and disconnecting the secure connection upon a completion of the download.

4. The billing method as recited in claim 3 wherein the disconnecting is performed by the server automatically.

5. The billing method as recited in claim 1 further comprising, prior to the requesting of the data, disconnecting an existing secure connection by the server.

6. The billing method as recited in claim 1 further comprising, prior to transmitting the acknowledgment message, performing an interrogation, the interrogation including displaying the price for the requested data, and manually acknowledging or rejecting the displayed price.

7. The billing method as recited in claim 6 wherein the acknowledgment message includes the manual acknowledgment or rejection.

8. The billing method as recited in claim 6 wherein the interrogation is performed using a dialog box at the client.

9. The billing method as recited in claim 6 wherein the interrogation is implemented using an error message at the client.

10. The billing method as recited in claim 1 wherein the security management protocol is implemented using an implementation application, the implementation application including one of a Java applet and an Active-X application.

11. The billing method as recited in claim 10 wherein the implementation application is signed.

12. The billing method as recited in claim 1 wherein the transmitting the price is performed using signed XML pages.

13. The billing method as recited in claim 12 wherein the XML pages are signed with at least one of a price indication and a time indication.

14. The billing method as recited in claim 13 wherein a hash value of the requested data is also included in the signature.

15. The billing method as recited in claim 1 wherein the requested data includes content.

* * * * *